United States Patent [19]

Abplanalp et al.

[11] Patent Number: 4,559,198
[45] Date of Patent: Dec. 17, 1985

[54] METHOD OF MOLDING AN AEROSOL CONTAINER CLOSURE

[75] Inventors: Robert H. Abplanalp, Bronxville; Virgil Naku, Hawthorne, both of N.Y.

[73] Assignee: Precision Valve Corporation, Yonkers, N.Y.

[21] Appl. No.: 648,750

[22] Filed: Nov. 29, 1984

Related U.S. Application Data

[62] Division of Ser. No. 606,547, May 3, 1984.

[51] Int. Cl.⁴ ............................ B60C 1/00; B29D 3/02
[52] U.S. Cl. ..................................... 264/259; 425/110; 425/302.1
[58] Field of Search ..................... 425/110, 112, 302.1; 264/259

[56] References Cited

U.S. PATENT DOCUMENTS

| | | | |
|---|---|---|---|
| 2,548,305 | 4/1951 | Gora | 425/809 X |
| 2,553,590 | 5/1951 | Joswig | 425/809 |
| 4,095,637 | 6/1978 | Krishnon | 264/259 X |
| 4,336,011 | 6/1982 | George et al. | 425/110 X |
| 4,352,712 | 10/1982 | Paul | 425/110 X |
| 4,353,775 | 10/1982 | Paul | 425/110 X |

Primary Examiner—J. Howard Flint, Jr.
Attorney, Agent, or Firm—Davis Hoxie Faithfull & Hapgood

[57] ABSTRACT

Apparatus and method for applying gasket material to the skirt of a gasket for the mounting cup of an aerosol container, wherein the gasket material is mechanically applied to the mounting cup through the use of a novel mandrel and cutting arrangement. A mounting cup, having a uniquely placed gasket, said gasket extending from the skirt into the channel of the mounting cup.

2 Claims, 27 Drawing Figures

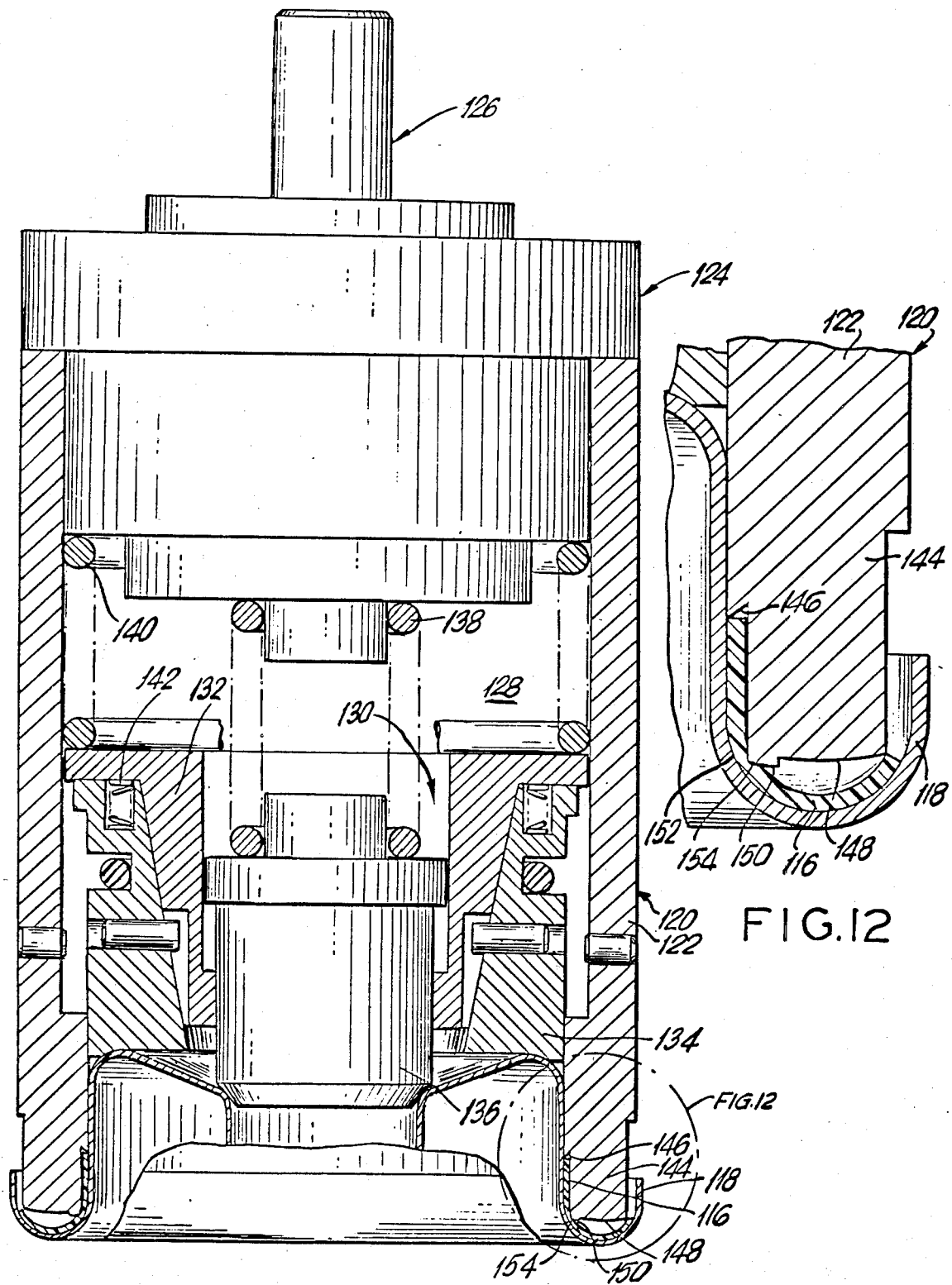

METHOD OF MOLDING AN AEROSOL CONTAINER CLOSURE

This application is a division of Ser. No. 606,547, filed May 3, 1984.

BACKGROUND

Aerosol dispensing containers have found widespread use in the packaging of fluid materials including a variety of both liquid and powdered particulate products. Such containers are provided with a valve-controlled discharge orifice and operate by the action of a volatile propellant which is confined within the container together with the product to be dispensed. Because the propellant has an appreciable vapor pressure at room temperature, the product in the closed container is maintained under super-atmospheric pressure.

A typical aerosol unit comprises a hollow cylindrical container which is tightly closed at one end and is provided with an opening at its opposite end for receiving a dispensing valve assembly. A closure, commonly referred to as a mounting cup, serves as the closure for the container and as a support for the valve assembly. Typically, the mounting cup comprises a panel having an aperture for receiving the valve assembly, a skirt depending from the periphery of the panel, and an annular channel extending outwardly from the edge of the skirt. When the mounting cup is placed in sealing position on the container, the channel is positioned over the bead surrounding the container opening and the lower portion of the skirt adjacent to the channel is flared outwardly against the container wall adjacent the bead. To ensure adequate sealing between the closure and the container, the cup is provided with a gasket which may reside in the annular channel or predominantly in the channel of the cup.

Heretofore, mounting cup gasket seals have been formed by disposing a previously cut gasket in the channel. This type of gasket has the disadvantage of not being stationary relative to the mounting cup during propellant filling or other valve unit assembly operations with the undesirable consequence that when the mounting cup and container are clinched to effect the seal, the gasket is often disposed at an angled position, and thus the clinching operation is less effective.

Another commercial method for forming the gasket onto the mounting cup consists in forming the gaskets in suit from liquid gasket-forming compositions comprising an elastomer dispersed or dissolved in a volatile organic liquid vehicle. In the manufacture of such a gasket, the liquid composition is deposited in the desired configuration in the channel of the cup while the cup is rotated beneath a metering nozzle through which the composition flows. The deposit is then converted into a dry solid sealing mass by expelling the liquid vehicle at elevated temperatures. Though this technique of flowing gaskets into place has received wide commercial acceptance, it suffers from the disadvantages of requiring an elaborate drying operation, wherein the mounting cup must be handled carefully so as to avoid undue upset from the horizontal; costly recovery apparatus for the expelled organic liquid also must be provided. In sum, the flowed gasket is an expensive step in the formation of the mounting cup. See U.S. Pat. No. 3,342,381 as an example of the "flowed" gasket.

Other techniques for disposing a gasket onto the mounting cup are described in U.S. Pat. No. 3,417,177 wherein the gasket seal is made of heat shrinkable material. After placing a band of gasket material on the skirt, the gasket having a greater diameter than the outside diameter of the skirt of the mounting cup, the cup is heated at a temperature and for a time sufficient to shrink the band into tight frictional engagement with the skirt.

Another similar technique is that disclosed in U.S. Pat. No. 3,443,006, wherein a band of gasket material is swelled through the use of a suitable swelling agent so as to increase its diameter to fit over the skirt of the mounting cup. Subsequently, the swelling agent is removed from the gasket material so that the band will come into tight frictional engagement with the skirt.

Both the heat shrink and swelling techniques for applying a gasket material to the mounting cup have the disadvantage of being costly and relatively time consuming procedures. Note in U.S. Pat. No. 3,417,177, column 4, lines 27-31, that the positioned bands must be heated to 240° F. for about 2-3 minutes in order to obtain a tight friction fit. In the procedure of U.S. Pat. No. 3,443,006, the bands must stand in the swelling liquid for a period of $\frac{1}{2}$ to $1\frac{1}{2}$ minutes according to example 2 of the '006 patent and then allowed to stand for the drying period. Also, in any mass production utilizing the '006 system, an organic liquid recovery system must be employed.

In the U.S. patent application Ser. No. 112,791, filed Feb. 1, 1980, is described a novel gasketed mounting cup system, including novel method and apparatus, wherein the gasket material is disposed on the mounting cup in the preferred position for effecting a seal between the mounting cup and the bead of the container; and further wherein the disadvantages associated with the aforementioned techniques of applying the gasket material to the cup are obviated. Also, an apparatus and method is provided wherein gaskets are applied to aerosol mounting cups in an exceptionally rapid and efficient manner to form gasketed-mounting cups having excellent selling characteristics.

In general, the method of the invention of the aforesaid U.S. Ser. No. 112,791 comprises passing a tubular sleeve of gasket material onto a compressible mandrel; initially positioning and aligning the skirt of the mounting cup and the contiguous end of the mandrel such that the sleeve of gasket material may pass onto the skirt, said mandrel having fixed and moveable portions with respect to each other and to their movement toward and away from the mounting cup; urging the moveable portion of the gasket material bearing mandrel toward the mounting cup such that the gasket material passes onto the skirt of the cup; causing the moveable portion of the mandrel to retract to its initial position, cutting the sleeve at a point between the mounting cup and the mandrel to leave a band of gasket material; and subsequently, advancing the mounting cup to a station whereat the band of the gasket material is urged further onto the skirt of the mounting cup, whereby, the band of gasket material does not extend beyond the skirt of the mounting cup. At this stage, the gasketed-mounting cup may be further processed.

For certain applications of the gasketed mounting cups of Ser. No. 112,791, namely, utilizing said mounting cups in so-called "under the cup" propellant filling of the container, it was observed that on limited occasions the gasket band was removed from the mounting cup during the filling operation. Moreover, observation revealed a tendency in an untoward number of gasketed mounting cups for the band of gasket material to recede from its position in the channel or curl portion of the mounting cup before crimping the mounting cup to the container. Both of these disadvantages reduce productivity on a mass production basis.

The subject invention is an improvement in the method and apparatus utilized in the aforesaid Ser. No. 112,791 and the cup produced thereby.

In general, the product of the subject invention comprises diposing one or more compressive deformations in the band of gasket material.

The present invention will be more clearly understood by referring to the drawings herein and the discussion relating thereto.

In the drawings:

FIG. 11 is the apparatus of FIG. 10 in the advanced mode relative to the mounting cup.

FIG. 12 is an enlargement of the circled portion of FIG. 11.

Figure 15:
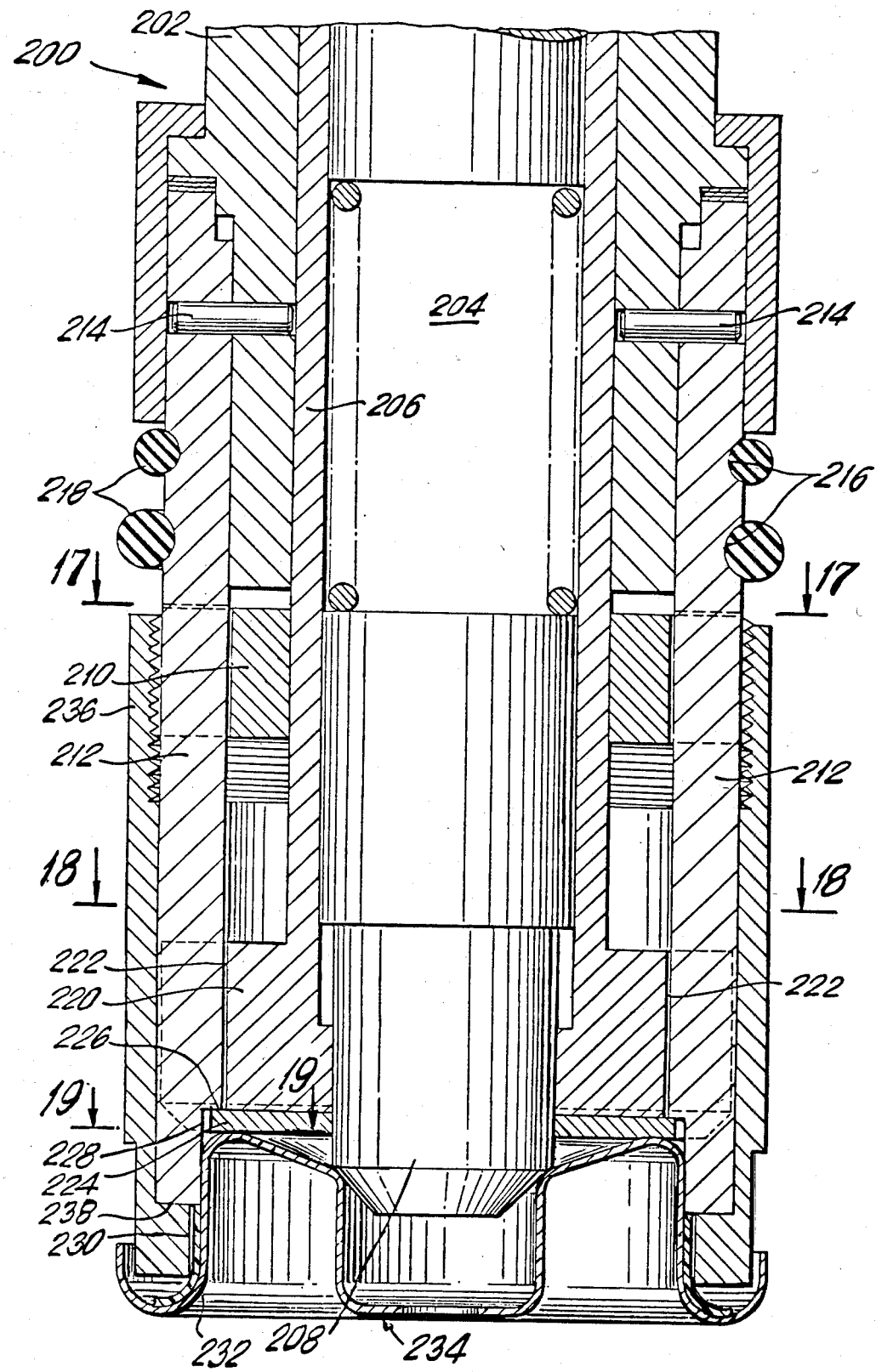
FIG. 15 is a partial sectional view of the preferred apparatus used in the operation to advance the band of gasket material onto the mounting cup such that the end of the gasket material resides on the straight portion of the skirt of the mounting cup.
Figure 17:
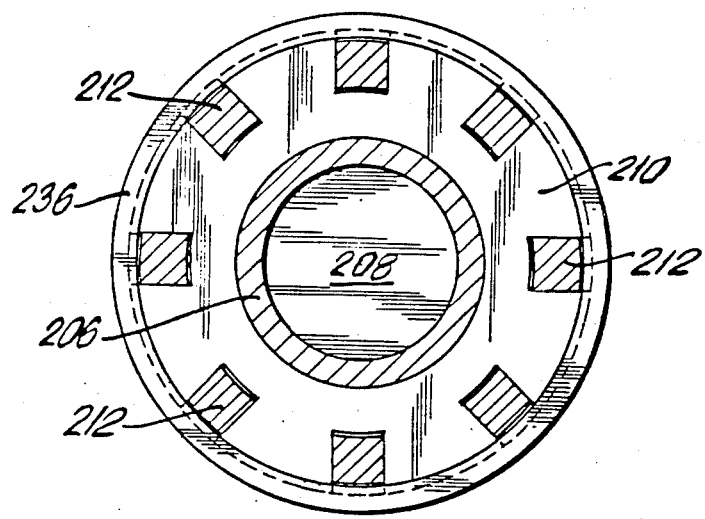
Figure 16:
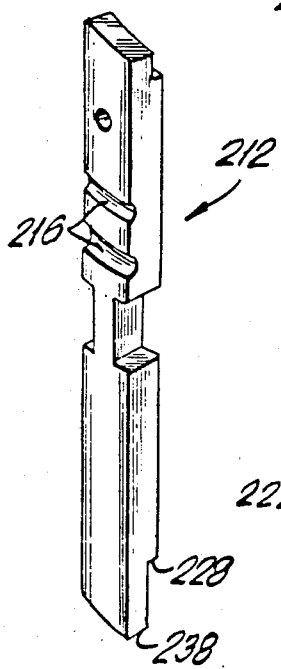
FIG. 16 is a perspective view of one of the flexible fingers of the apparatus of FIG. 15.
Figure 18:
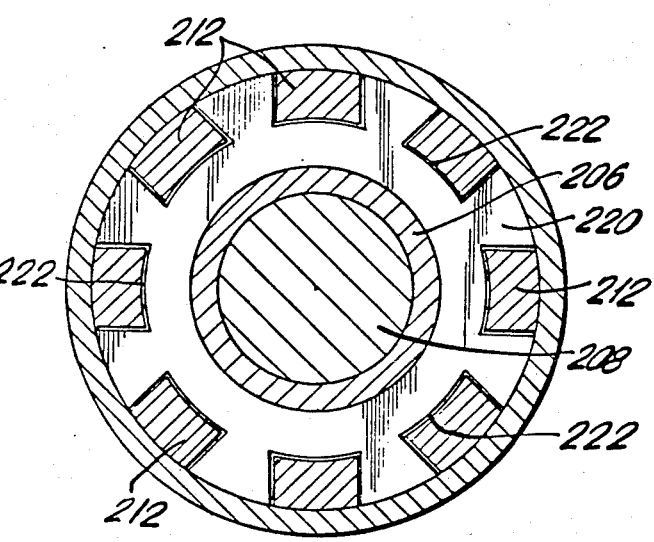

FIGS. 17 and 18 are a plan view along the lines 17—17 and 18—18 of FIG. 15.

Figure 19:
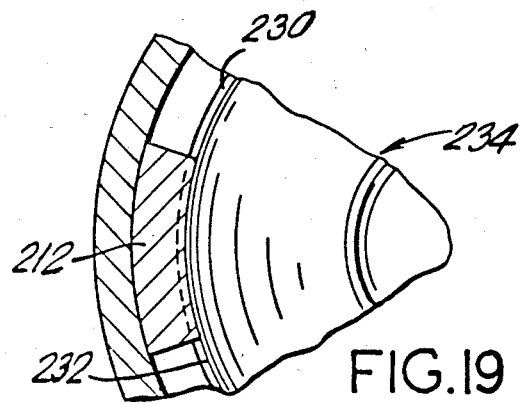

FIG. 19 is a plan view along the line 19—19 of FIG. 15.

Figures 20, 21, 22:
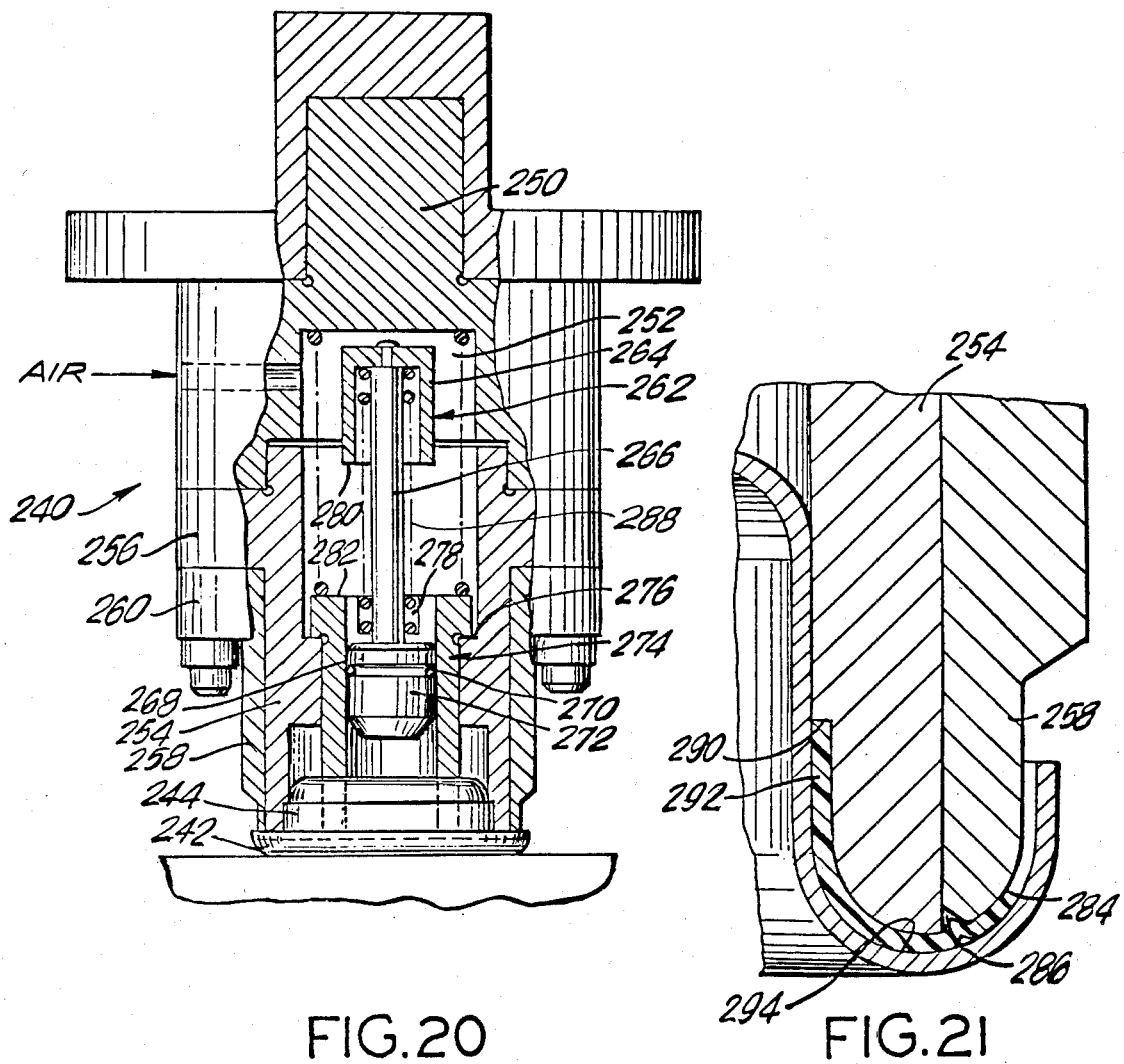

FIG. 20 is a partial sectional view of the preferred apparatus used in the operation to advance the gasket material to its ultimate position on the mounting cup.

FIG. 21 is an enlarged partial sectional view of the plunger sleeve of FIG. 20 mounting cup and gasket material in the fully advanced position of said plunger sleeve.

FIG. 22 is a plan view of the top surface of a member of the centering mechanism.

Figure 1:
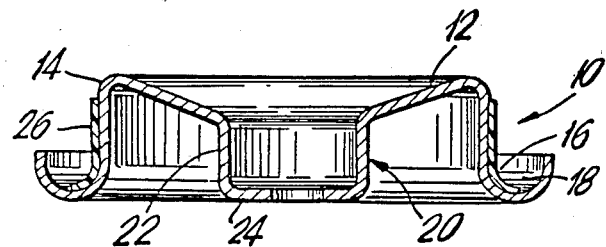
FIG. 1 shows in section view a gasketed aerosol mounting cup prepared according to the method and apparatus of the invention of Ser. No. 112,791.

FIG. 1 is a sectional view of a gasketed-mounting cup shown in inverted position relative to its placement in the assembled container and produced according to the general method of Ser. No. 112,791. The mounting cup, generally designated as 10, comprises a circular panel 12 having an integral skirt 14 depending from its periphery. The free edge of skirt 14 is outwardly flanged at 16 to form an annular channel 18 for embracing the bead surrounding the container opening (not shown), then the cup is positioned thereon. The inner portion of panel 12 is countersunk to form a tubular rim, generally designated as 20, which has a dependent circular wall 22 integrally joined with an apertured horizontal wall 24. When the cup is placed in sealing position, the rim 20 acts as a pedestal for the valve unit and the valve stem is admitted into the container through apertured wall 24. The gasket 26 is disposed on the exterior surface of the skirt 14 and extends beyond the juncture of the skirt and channel and a distance into said channel.

Figure 2A:
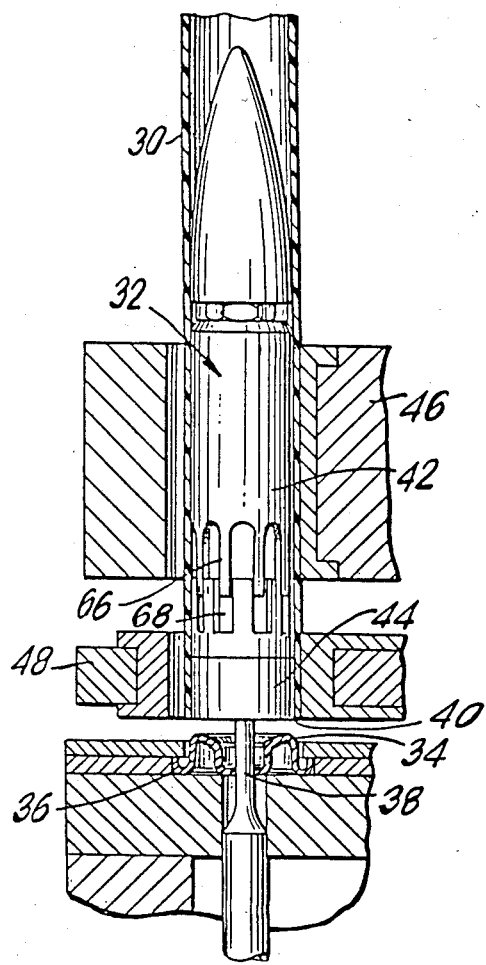
FIGS. 2A-2F is a schematic of one embodiment of the invention of Ser. No. 112,791, showing the several steps utilized in positioning the gasket material onto an aerosol mounting cup.

In FIGS. 2A-F, corresponding parts in each figure are as numbered and described in FIG. 2A, said figures showing a schematic of the relative positioning of the moving components of the apparatus at each stage of the cycle in advancing a plastic gasket material onto a mounting cup and cutting the tube to ultimately provide a band of gasket material disposed on the skirt of the mounting cup.

In FIG. 2A, a sleeve of gasket material 30 is disposed over the length of the mandrel, generally designated as 32. Mounting cup 34 is securely positioned within a seat 36, which is mounted on a suitable base, in a manner known to those skilled in the art. Positioning pin 38 extends through the central aperture in the pedestal of the mounting cup 34 and provides a fixed spacing between the bottom surface 40 of the mandrel 32 and the mounting cup 34. Mandrel 32 has an upper portion 42 and a lower portion 44 which are retractably collapsible relative to each other (the structure of which is more fully described in FIG. 4). An upper and lower gripping member is provided at 46 and 48, respectively.

FIG. 2A, the initial stage of a single cycle, shows the mandrel 32 disposed atop the positioning pin 38, with the mandrel 32 having the gasket material disposed at the initial cycle stage, i.e., terminating at the bottom surface 40 of the mandrel 32. Both gripping members, 46 and 48, are in an open position.

Figure 2B:
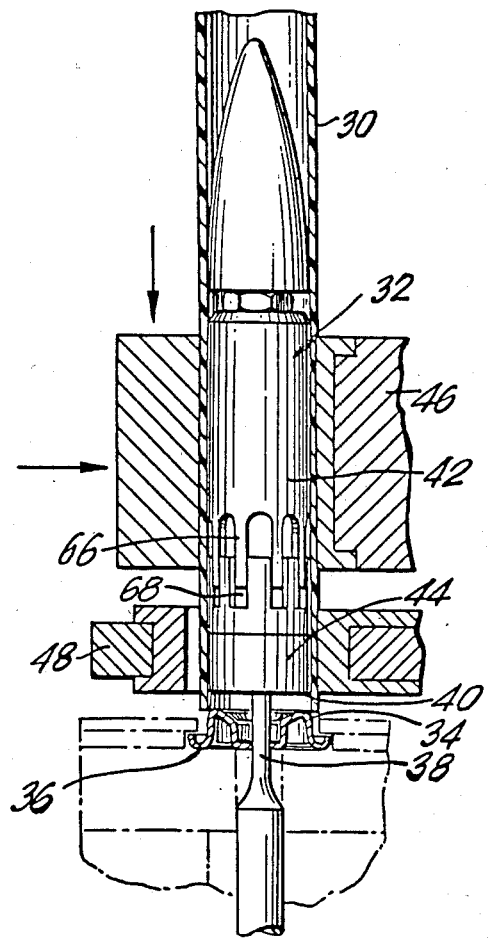

In FIG. 2B, the upper gripping member 42 closes about the mandrel 32 and subsequently moves the upper portion 42 of the mandrel 32, toward the mounting cup 34. By this motion, the gasket material 30 is moved past the stationary bottom surface 40 of the mandrel 32. Both gripping members, 46 and 48, are in an open position.

Figure 2F:
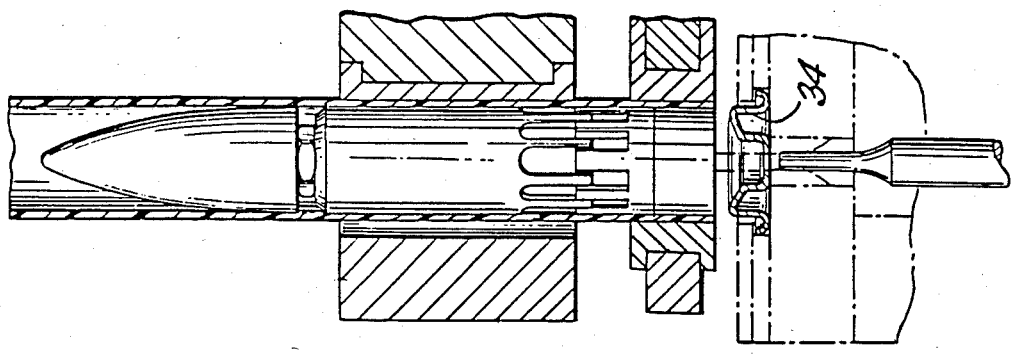
Figure 2E:
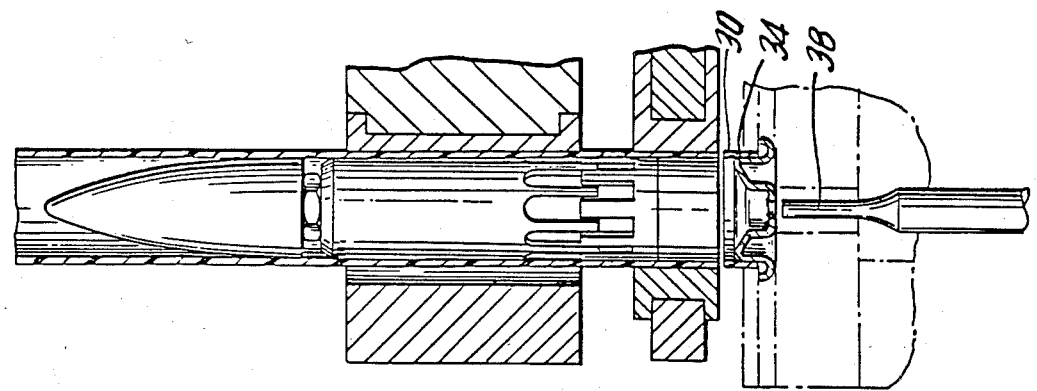
Figure 2D:
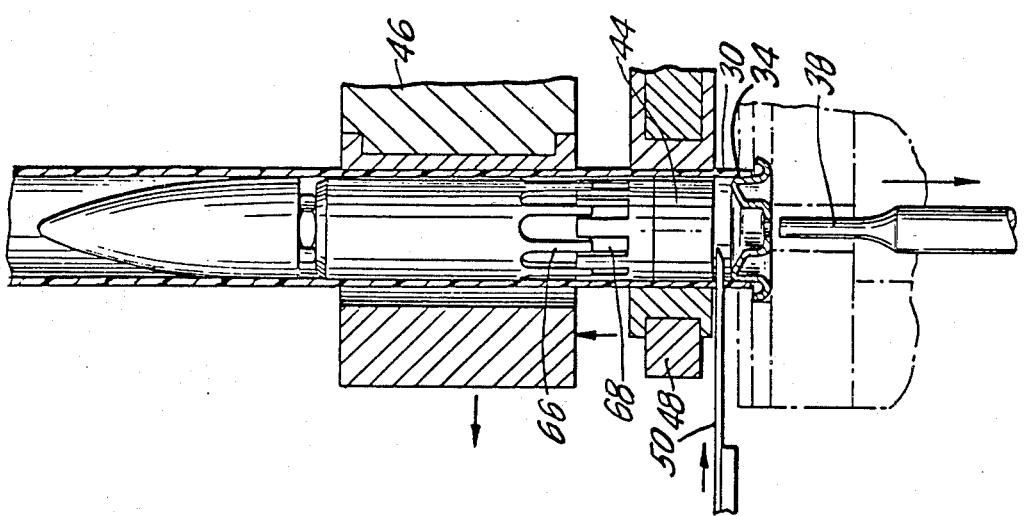
Figure 2C:
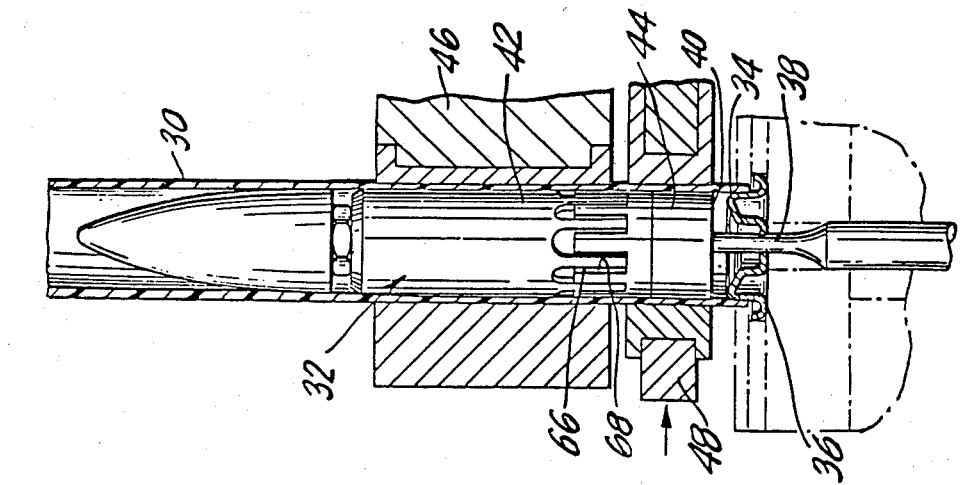

In FIG. 2C, the gasket material is first disposed on the skirt of the mounting cup 34 the desired distance, and subsequently, the lower gripping member 48 engages the lower portion 44 of the mandrel 32.

At the next stage of the cycle, FIG. 2D, the upper gripping member 46 releases allowing the upper portion 42 of the mandrel 32 to return to its original position. Concomitantly, the positioning pin 38 is lowered beneath the mounting cup 34 and thereafter a cutting edge 50 (shown only in FIG. 2D) is passed through the gasket material 30.

FIG. 2E, shows a mounting cup with a band of the gasket material 30 on the skirt of the mounting cup.

At the next stage, FIG. 2F, the bottom gripper 48 is closed on the bottom portion 44 of the mandrel 32 and positioning pin 38 is moved to the position shown in FIG. 2A, after which the gripper 48 is released and the system is at the initial stage shown in FIG. 2A.

Figure 3:
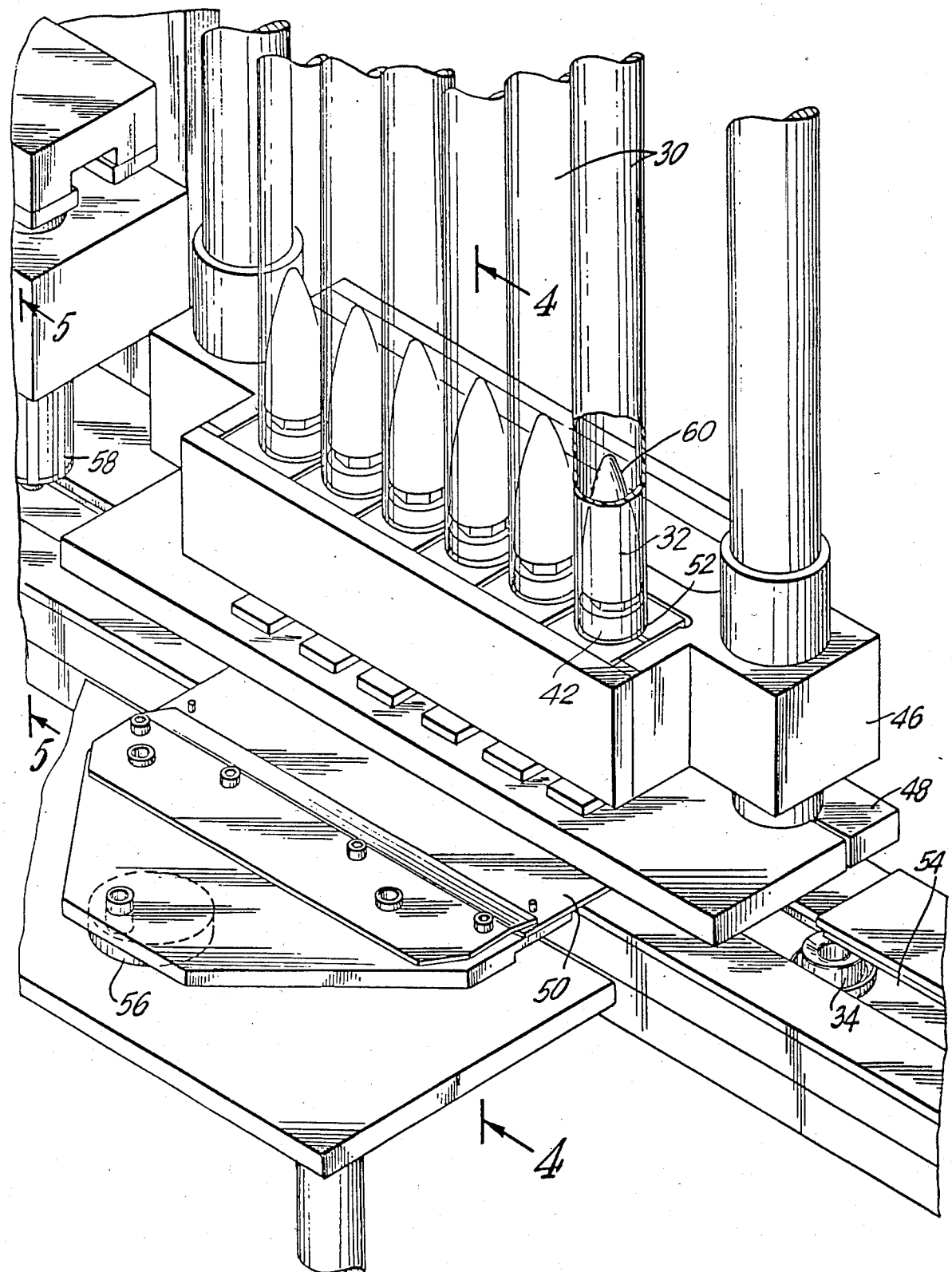
FIG. 3 is a perspective view of the apparatus of the embodiment of FIG. 2, together with the apparatus used in a second operation novel to this invention, on the product of the embodiment of FIG. 2.

FIG. 3 shows a six-station gasket-mounting cup assembly. The gasket material 30 is fed from individual rolls (not shown) of said material. Upper gripping member 46 has a series of openings 52 which receive the mandrel 32. The bottom gripping member is 48. Mounting cup 34 is fed through a raceway 54 to a position beneath each of the mandrels 32. Not shown for reason that it is known to those skilled in the art, is the structure which transports, here six, a given number of mounting cups along the raceway 52 to their respective positions in vertical alignment with each associated mandrel. In the timing chart of FIG. 6, these structures are referred to as the feed finger, feed arm and locator device. Cutting edge 50 is mounted onto a rotating wheel 56 in such a manner as to impart an elliptical motion as the cutting edge advances and retreats during the cutting cycle. After the mounting cup has received the gasket material 30, the cup is moved to a station whereat a hollowed bottom plunger 58, shown in more detail in FIG. 5, advances over the skirt of the mounting cup and urges the gasket material 30 along the skirt.

Figure 4:
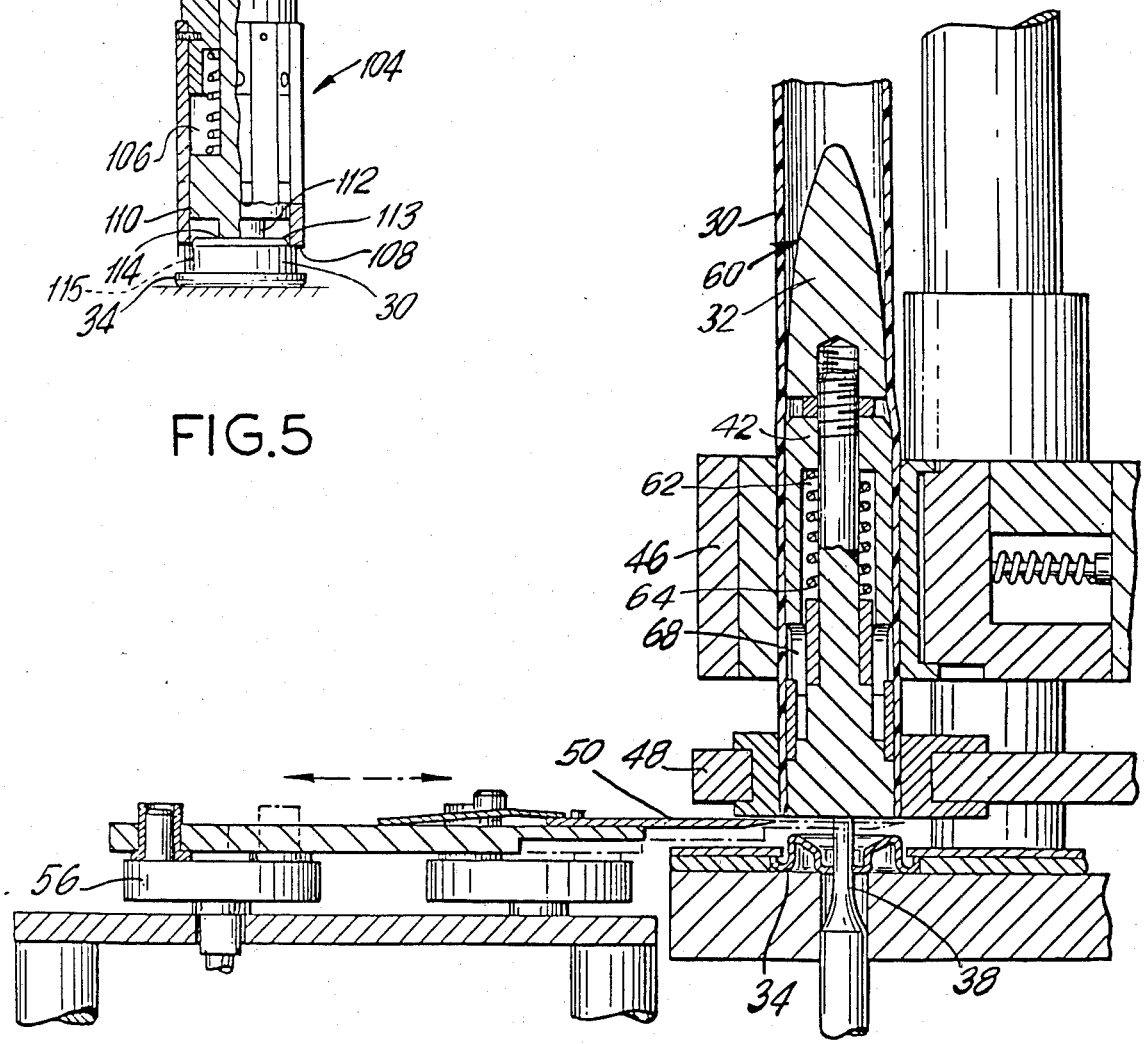
FIG. 4 is a sectional view of the apparatus of the embodiment of FIG. 3, along the line 4—4 of FIG. 3.

FIG. 4 shows in more detail the structure of a single mandrel-mounting cup station of the embodiment shown in FIG. 3. The upper portion 42 of the mandrel 32 has a tapered upper surface 60 which is threaded onto the upper portion 42, the shape of the portion 60 facilitating the passing of the gasket material onto the mandrel 32. Further, the upper portion 42 of the mandrel 32 has a cavity 62 in which is disposed a spring 64. Shown best in FIGS. 2A-F are the plurality of fingers 66 which form the bottom end of the upper portion 42 of the mandrel 32, and the plurality of recess 68 in lower portion 44 of the mandrel 32, and which are aligned to receive the fingers 66 when the upper portion of the mandrel 32 is moved toward the lower portion of the mandrel.

The upper gripping member 46 is a conventional chuck which is connected to a reciprocating ram such that it may rapidly advance and retreat from the mounting cup and when gripping the upper portion of the mandrel move said portion toward the mounting cup.

The lower gripping member 44 is a conventional chuck.

The cutting edge 50 is mounted in a conventional manner and proscribes an elliptical path in its advance and retreat from the mounting cup 34.

Figure 5:
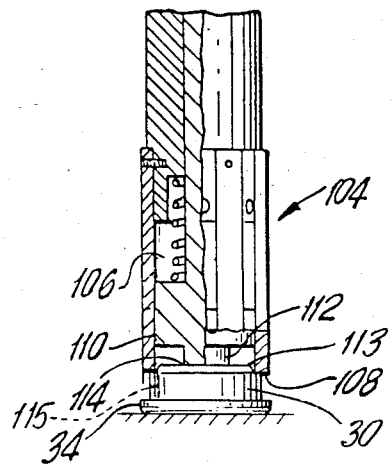
FIG. 5 is a partial section of the apparatus used in the second operation of the product of the embodiment of FIG. 2, along the line 5—5 of FIG. 3.

FIG. 5 shows a reciprocating plunger, the lower outer shoulder of which engages the upper edge of the gasket material and urges it further onto the skirt of the mounting cup. In FIG. 5, the plunger, generally designated as 104, has a lower hollow portion 106, terminating in shoulder 108. Set within the lower portion 106 is a spring-loaded centering pin 110 having the protuberance 112. The protuberance 112 has the beveled terminating portion 114 which mates with and centers the mounting cup 34 by contacting the sloped panel 113 of the mounting cup.

The function of the plunger action shown in FIG. 5 is to advance the band of gasket material onto the mounting cup such that the band resides at or below the sloped surface 113 of the mounting cup 34. The purpose of so disposing the gasket band is to provide a band edge supported against the straight portion 115 of the skirt of the mounting cup 34, thereby to be properly positioned to mate with the plunger in the second and final plunger action for advancing the band of gasket material to its ultimate position on the mounting cup.

Figure 6:
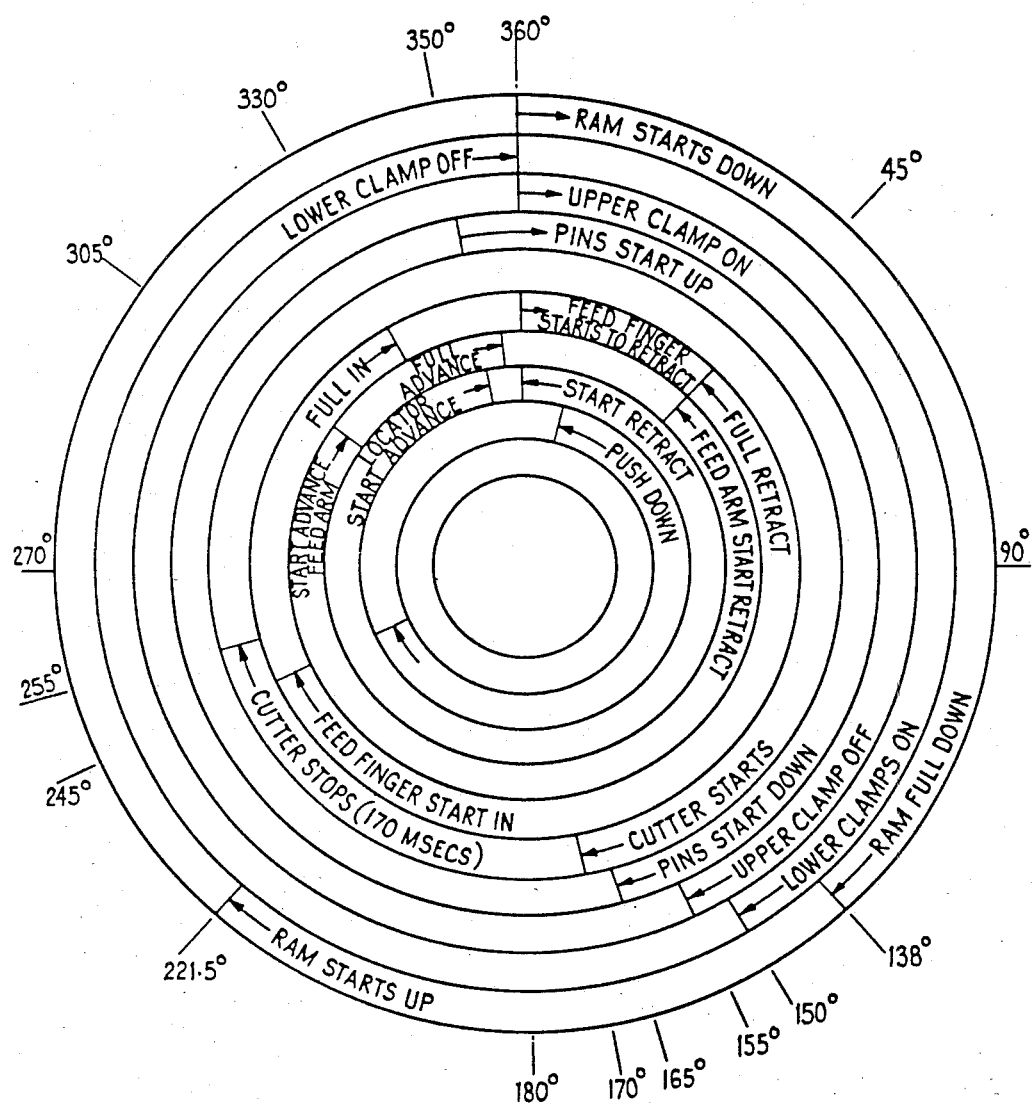
FIG. 6 is a timing diagram through a single cycle for producing the mounting cup according to the embodiment of FIG. 2.

FIG. 6 describes a timing cycle that is suitable for the six-station unit shown in FIG. 3. In FIG. 6, the clamp is the gripping member, pins the positioning pins, feed finger and feed arm are a conventional mechanism for advancing six mounting cups per cycle to be positioned to receive the gasket material.

Figure 7:
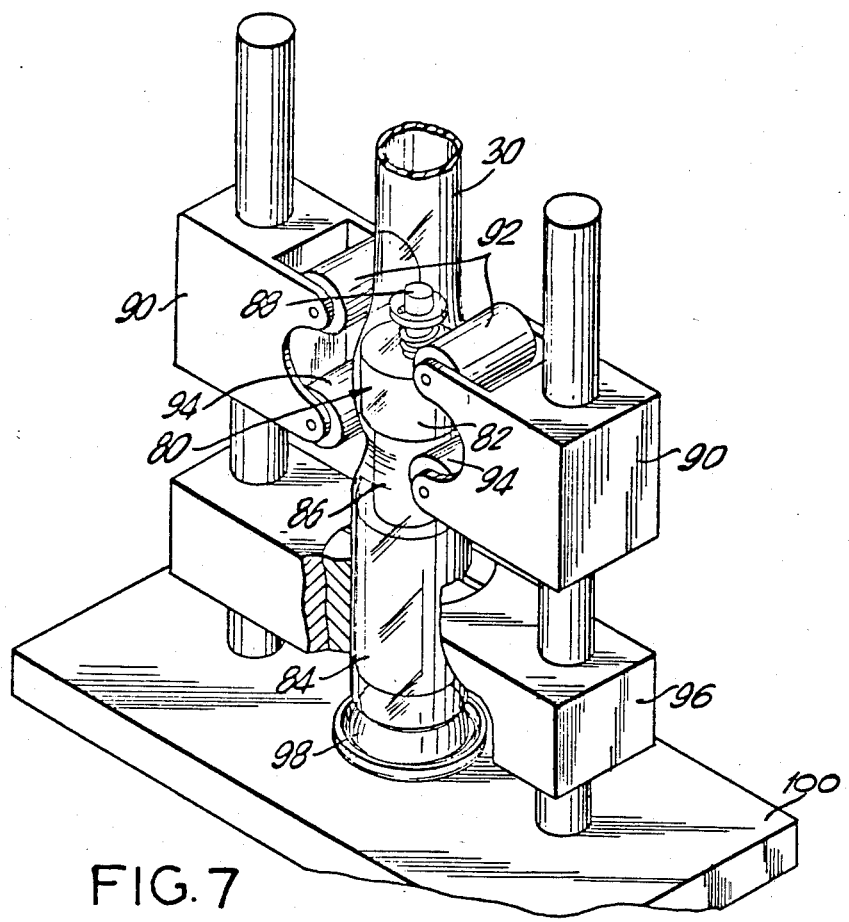
FIG. 7 is a perspective view of a second embodiment of the invention.
Figures 8, 9:
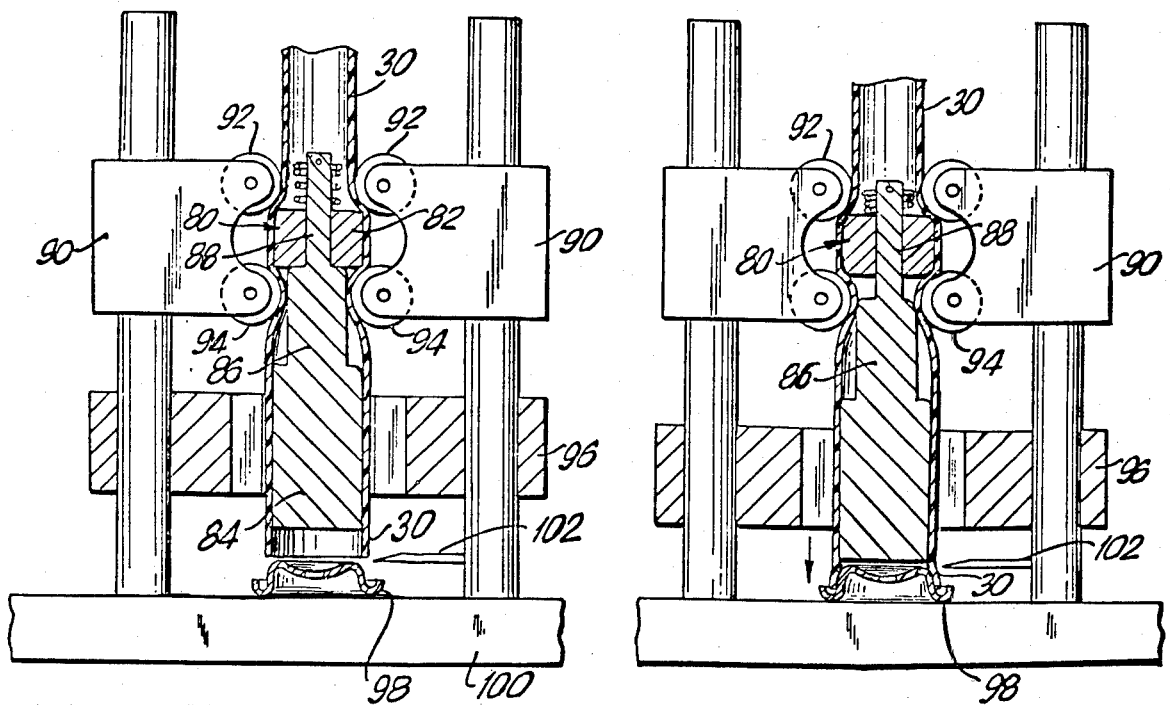
FIGS. 8 and 9 are views of the apparatus of the embodiment of FIG. 7, showing the positioning of the apparatus in an initial and advanced position, respectively, relative to the mounting cup.

A second embodiment of the mandrel-gripper arrangement is shown in FIGS. 7-9. This embodiment offers the improvement of simplified construction avoiding the need for a positioning pin passing through the central opening in the mounting cup. In the perspective view of FIG. 7, the gasket material 30 is passed over a mandrel, generally designated as 80. The mandrel 80 has an upper portion 82 and a lower portion 84, the latter having recessed portion 86 and upper extension 88 which passes through upper portion 82, said upper extension 88 being resiliently mounted against the upper surface of portion 80. Upper gripping member has upper and lower sets of rollers 92 and 94, respectively, said rollers being adjusted against upper mandrel portion 82 so as to preclude movement of mandrel portion 80. The lower gripping member 96 is of conventional chuck design and has means, not shown, for reciprocally advancing the lower gripping member toward the mounting cup. The mounting cup 98 is affixed in a suitable holding device on the base 100.

FIG. 9 shows the mandrel-gripper arrangement of the embodiment of FIG. 7 in initial position for starting the gasket material onto the mounting cup. The gasket material 30 extends beyond the mandrel portion 84, a short distance, ¼" has been found satisfactory. FIG. 9 shows the lower gripper 96 closed onto the mandrel portion 84. Moving the lower gripper 96 toward the mounting cup 98, advances the gasket material 30 onto the skirt of the mounting cup. The nature of the gasket material is such that as the mandrel portion 84 is advanced toward the mounting cup, the gasket material 30 passes through the rollers 92 and 94 of the upper gripping member 90. After the gasket material has been placed onto the skirt of the mounting cup, the lower gripping member 96, is released and the mandrel portion 84 returns to the initial position shown in FIG. 8; the cycle is then ready to be repeated. After the return of the mandrel portion 84, the cutting edge 102 advances to sever the gasket material. After cutting, the mounting cup is passed to a station (see FIG. 5), whereat the gasket material 30 is advanced further onto the skirt of the mounting cup. The single mandrel of FIGS. 7-9 may, as with the embodiment of FIGS. 2-5, comprise a multiple mandrel-gripping member arrangement.

Subsequent to the initial advancing of the band of gasket material onto the skirt of the mounting cup, the mounting cups are passed on conventional tracking through a zone wherein the band of gasket material is heated by conventional heating means. For example, the heating zone might be the conventional mounting cup tracking in indirect heat exchange with an insulated heated water system, said water system being capable of close control through conventional heated water control systems. Heating the mounting cup 160°–180° F. has been found satisfactory.

From the heating zone the gasketed mounting cups are passed to the secondary plunger station. The plunger and plunging action at the secondary plunger station is described in FIGS. 10–12.

Figure 10:
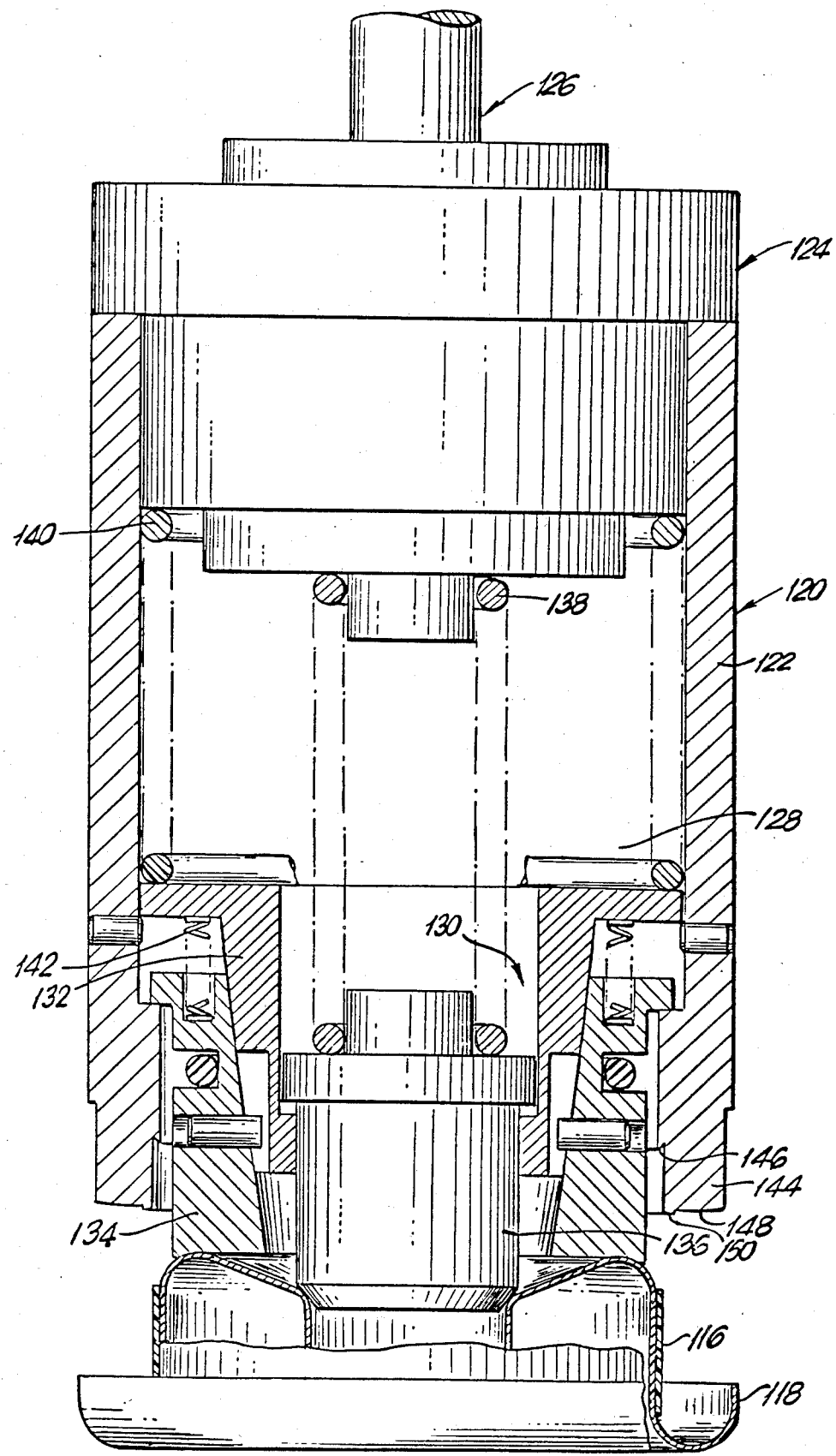
FIG. 10 is a partial sectional view of the apparatus used in the operation to advance the band of gasket material to its ultimate position on the mounting cup according to the subject invention, said apparatus being shown in non-advanced mode relative to the mounting cup.

In FIG. 10, the band 116 of the gasket material is shown in its initially advanced position on the skirt of the mounting cup 118. The plunger of FIG. 10, generally designated as 120, comprises an outside sleeve portion 122, a head portion 124, a chuck portion 126, which chuck portion is attached to the plunger advancing mechanism (not shown), the head portion 124 and sleeve portion 122 defining a recess 128. Within the recess 128 is a mounting cup stripping member, generally designated as 130, which comprises slidably mating portions 132 and 134, and a mounting cup centering member 136, which centering member 136 is biased away from the head portion 124 by a spring 138. Portion 132 of the mounting cup stripping member 130 is biased away from the head portion 124 by a spring 140. Portion 134 of the mounting cup stripping member 130 is biased away from portion 132 by spring 142.

The sleeve 122 has a lower portion 144 having an annular shoulder 146 and an edge portion 148. The shoulder portion 146 engages the band of gasket material 116 while advancing the band to its ultimate position on the mounting cup 118.

The edge portion 148 has a configuration, best shown in FIG. 12, having a lug portion 150. The edge 148 has a slightly radiused contour.

In operation, the mounting cups 118 are suitably placed at the secondary plunger station. When in place, the plunger 120 is advanced toward the mounting cup 118 by centering the cup relative to the plunger 120, the mounting cup centering member 136 serving this function. Also the mounting cup stripping member 130 is brought into contact with the cup, as shown in FIG. 10. Upon further advancement of the plunger 120, the completion of which is shown in FIG. 11, the sleeve 122 advances to engage the shoulder 146 against the band of gasket material 116 and urge the band 116 further onto the skirt of the mounting cup 118, ultimately advancing the band to the final position shown in FIG. 11. As shown in FIG. 11, the edge 148 of the sleeve 122 terminates its advance by bottoming against the walls 152 of the channel of the mounting cup, while concomitantly producing an annular rib 154 in the band of gasket material 116 through the compressive deformation caused by the lug 150 acting against the gasket material. During retraction of the plunger 120, the portion 134 of the mounting cup stripping member is biased against the mounting cup 118 by the spring 142 until such time as the sleeve 122 moves clear of the advanced gasket, thus precluding the retracting sleeve 122 from lifting the mounting cup 118. Obviously, the springs 140 and 142 must be designed to permit portion 132 to advance toward portion 134 during the advance of the plunger 120.

The preferred plungers used at the secondary plunger station are described in FIGS. 15–21.

In FIG. 15, the plunger generally designated as 200 has an arbor 202 which is connected through conventional means to a reciprocating ram (not shown) within the bore 204 is telescoped member 206 which is independently spring loaded within the bore 204. The telescoped section 206 terminates in a slotted collar portion 220. Positioned within member 206 is mounting cup centering means 208, which is independently spring loaded. Slotted collar 210 is disposed outboard of telescoped section 206, the slots of said collar 210 receiving fingers 212. The fingers 212 (shown in more detail in FIG. 16) are affixed to the arbor 202 through dowel pins 214. The slots 216 (FIG. 17) receive O rings 218, the purpose of the O rings being to provide a constant inwardly directed pressure on the fingers 212. The fingers 212 are also positioned within the slots 222 (FIG. 18) of the slotted collar portion 220. Affixed to the bottom of telescoped member 206 is a plate 224, said plate 224 providing a shoulder 226 against which the bottom shoulder 228 of the fingers 212 abut during the advancement of the plunger 200. The distance that the fingers 212 travel before meeting the shoulder 226 determines the distance that the gasket 230 will be advanced onto the skirt 232 of the mounting cup 234. Threadedly mounted onto the slotted collar 210 is an outer adjustable sleeve member 236 which sleeve member 236 functions to prevent outward splaying of the fingers 212 and thereby to direct the bottom surface 238 of the fingers 212 against the top surface of the gasket material 230.

After initially advancing the gasket onto the mounting cup, the cup and gasket are heated to 160°–180° F. and then passed to the final plunger station.

In FIG. 20 is shown the plunger mechanism generally designated as 240, which initially centers the mounting cup 242 and advances the gasket 244 to its ultimate position on the mounting cup 242. The plunger mechanism 240 is attached to an arbor (not shown) which in turn is attached by conventional means to a reciprocating press (not shown). The plunger mechanism has a plug member 250 which has a central bore defining a chamber 252. Affixed to the plug member 250 is inner sleeve 254, said sleeve having a flange 256 for connecting to the plug member 250.

Outer sleeve 258 is connected to inner sleeve 254 through flange 260.

Centering mechanism, generally designated as 262, is disposed within the inner sleeve 254 and the chamber 252 and comprises a spring retainer and stop 264, rod 266, piston member 268, O rings 270 and centering plug 272.

Mounting cup stripper 274 is independently spring loaded and is assembled within the inner sleeve 254 and rests on shoulder 276 of inner sleeve 254. The opening 278 of the stripper 274 has a slot configuration which is shown in greater detail in FIG. 22. The slot configuration prevents the centering mechanism from being removed from the plunger assembly, the edge 280 of the spring retainer and stop 264 abutting against the upper surface 282 of the stripper 274. The leading surface 284 defined by the inner 254 and outer 258 sleeves is best shown in FIG. 21. Note the recess portion 286 in the surface 284 of the outer sleeve 258. Also note the shoulder 290 of the inner sleeve 254 (FIG. 21).

In operation the centering mechanism 262 is advanced toward the mounting cup by passing air under pressure into the chamber 252 said advancement occurring at the initial phase of the downward stroke of the reciprocating press. The air passes through the slot of the stripper 274 and generates a pressure against the piston 268 which overcomes the retracting pressure of the spring 288 and advances the centering mechanism against the mounting cup. Before the advancing sleeves contact the gasket, the centering mechanism is retracted by closing off the air supply and allowing the spring to return the mechanism to its retracted position. The plunger sleeves continue their advance and shoulder 290 engages the gasket 292 and urges the gasket further onto the mounting cup as shown in FIG. 21. The inner and outer sleeves ultimately bottom in the channel 294 of the mounting cup. During this bottoming action the sleeves effect a compressive force against the plastic gasket material and the gasket is folded into the recess 286, thereby deforming the surface of the gasket as shown in FIG. 21. After advancing and bottoming the plunger, the sleeves are retracted while retaining the stripper in contact with the mounting cup through its independent spring means for a portion of the retraction cycle, namely until the inner sleeve clears the mounting cup. Subsequent to the plunger action, the mounting cups are promptly cooled to about 40° F.

It has been found that with a mounting cup having a thickness of 0.011" a gasket material of 0.014" that setting of the advancement of the sleeves so that it terminates at 0.016" of the surface on which the mounting cup rests provides a satisfactory compression and deformation of the gasket material.

Preferably, following the advancement of the gasket material to its ultimate position on the mounting cup, the gasketed mounting cup is cooled to room temperature.

To form a friction fit between gasket material and the skirt of the mounting cup, the inside diameter of the sleeve of the gasket material is slightly less than the outside diameter of the skirt portion of the mounting cup. Conventionally, the so-called one inch aerosol mounting cups have a skirt diameter of "0.980-0.990". It has been found that gasket material having a thickness of 0.017 is satisfactory. To accomodate this thickness of gasket, mounting cups having a skirt diameter of 0.950 inches have been used. Gasket bands having a width of 9/32" have been satisfactorily employed.

While any plastic gasket material having sufficient resiliency may be used, provided however, that there is compatability between the container contents and the plastic material, it has been found that a plastic comprising low density polyethylene (density range of 0.916-0.922) having 5-15% polyisobutylene in the molecular weight range of 40,000-200,000, plus stabilizers usually used with polyethylene in the environment in which the gasket material will reside, provides a satisfactory gasket material over a broad product range.

Figure 13:
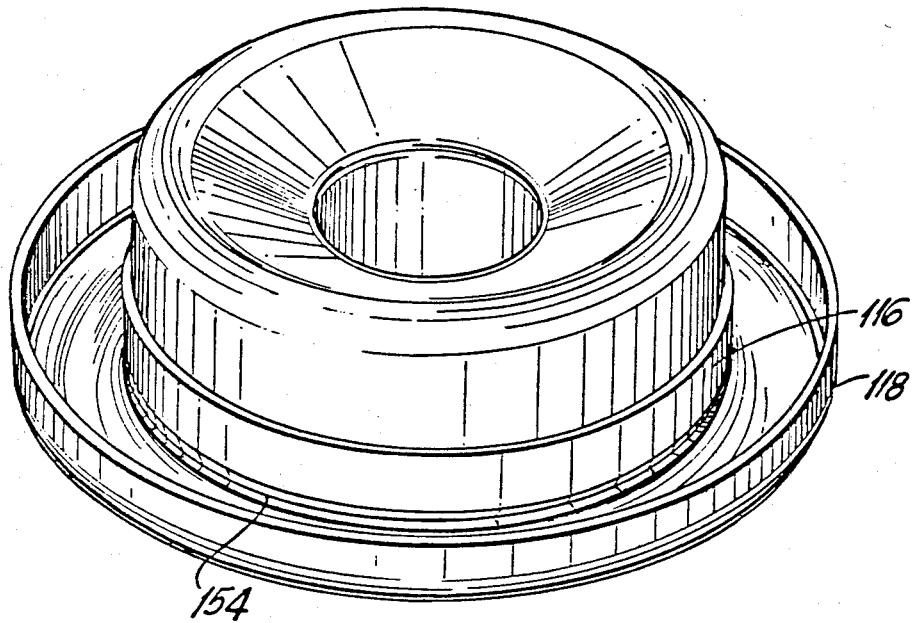
FIG. 13 is a perspective view of the gasketed mounting cup of this invention.
Figure 14:
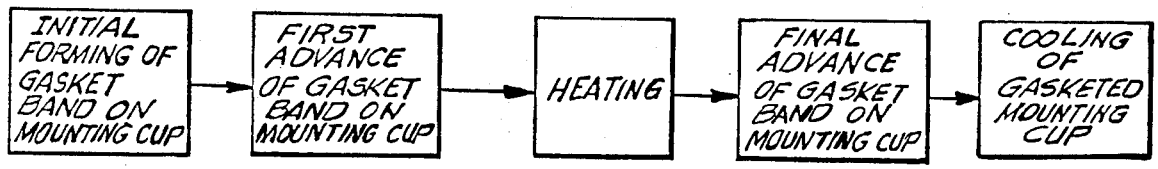
FIG. 14 is a schematic showing the several operations or stations in the preferred mode for the manufacture of the gasketed mounting cup of this invention.

While the invention has been specifically described in terms of providing an annular rib in the gasket, it should be understood that a series of ribs disposed radially along the width of the gasket may likewise be utilized. Also a plurality of annular ribs may be employed, it generally being found that a discontinuity to the planarity or smoothness of the gasket, such as by the described ribbing, imparts to the gasket a resistance to being dislodged during filling or a repositioning on the mounting cup by the gasket returning to the initial advanced position. FIG. 13 shows in perspective the novel gasketed mounting cup of this invention.

In contrast to mounting cups having gasket material only along the skirt portion of the cup, the cup of this invention, by having gasket material from the point of clinch between the cup and the container bead as well as extending the gasket material onto the channel, provides a mounting cup having superior sealing characteristics. Also, the gasket of the subject mounting cup is substantially uniform in thickness throughout prior to clinching to the container, whereas the "flowed-in" type gasket of the prior art is non-uniform, thinning toward the outer edge of the channel and where the skirt and channel intersect. Uniform thickness provides a better seal.

I claim:
1. The method for the mass production of a gasket-bearing aerosol mounting cup having panel, skirt and channel portions comprising
   (a) forming a band of gasket material on the skirt of the mounting cup which extends above the panel of said cup,
   (b) initially advancing the band of gasket material onto skirt of the mounting cup at a primary advancing station such that edge of the gasket material distal from the channel of the mounting cup is positioned at or below the periphery of the panel of the mounting cup,
   (c) heating the band of gasket material and
   (d) advancing the band of gasket material to its ultimate position on the mounting cup and simultaneously imparting a compressive deformation to the gasket material.
2. The method of claim 1, and further wherein the gasket is cooled subsequent to the formation of the rib.

* * * * *